(12) United States Patent
Ramanadin

(10) Patent No.: US 6,175,257 B1
(45) Date of Patent: Jan. 16, 2001

(54) INTEGRATED CIRCUIT COMPRISING A MASTER CIRCUIT WORKING AT A FIRST FREQUENCY TO CONTROL SLAVE CIRCUITS WORKING AT A SECOND FREQUENCY

(75) Inventor: M. Bernard Ramanadin, Palo Alto, CA (US)

(73) Assignee: STMicroelectronics S.A., Gentilly (FR)

( * ) Notice: Under 35 U.S.C. 154(b), the term of this patent shall be extended for 0 days.

(21) Appl. No.: 09/253,270

(22) Filed: Feb. 19, 1999

(30) Foreign Application Priority Data

Feb. 19, 1998 (FR) .................................................. 98 02162

(51) Int. Cl.$^7$ ................................................... H03L 7/00
(52) U.S. Cl. .................................. 327/141; 327/144
(58) Field of Search ................................ 327/141, 144, 327/145, 202, 203, 218

(56) References Cited

U.S. PATENT DOCUMENTS

| 4,160,154 | * | 7/1979 | Jennings | .................................. 235/92 |
|---|---|---|---|---|
| 4,495,629 | * | 1/1985 | Zasio et al. | .............................. 377/70 |
| 5,291,529 | * | 3/1994 | Crook et al. | .......................... 375/109 |
| 5,684,982 | * | 11/1997 | Gates . | |

FOREIGN PATENT DOCUMENTS

| 0 335 547 A2 | * | 3/1989 | (EP) | .............................. H03K/5/135 |
|---|---|---|---|---|
| 0 798 630 A1 | * | 3/1997 | (EP) | ................................. G06F/5/06 |

OTHER PUBLICATIONS

Patent Abstracts of Japan, vol. 007, No. 030, Feb. 5, 1983, and JP 57 182837 A (Nippon Victor KK), Nov. 10, 1982.*
Patent Abstracts of Japan, vol. 018, No. 364, Jun. 8, 1994, and JP 06 097925 A (Mitsubishi Electric Corp), Apr. 8, 1994.*

* cited by examiner

Primary Examiner—Toan Tran
Assistant Examiner—Linh Nguyen
(74) Attorney, Agent, or Firm—Theodore E. Galanthay; Allen, Dyer, Doppelt, Milbrath & Gilchrist, P.A.

(57) ABSTRACT

An integrated circuit includes a master circuit operating at a first frequency for controlling slave circuits operating at a second frequency. The integrated circuit uses registers for eliminating difficulties arising from different and independent frequencies of the master and slave circuits.

23 Claims, 1 Drawing Sheet

INTEGRATED CIRCUIT COMPRISING A MASTER CIRCUIT WORKING AT A FIRST FREQUENCY TO CONTROL SLAVE CIRCUITS WORKING AT A SECOND FREQUENCY

FIELD OF THE INVENTION

The invention relates to the field of integrated circuits, and, more particularly, to an integrated circuit having at least two circuits operating at independent frequencies.

BACKGROUND OF THE INVENTION

A master circuit designates a circuit that may control at least one other circuit, called a slave circuit. The slave circuit performs according to instructions dictated by the master circuit. For example, a state machine may be used to produce control sequences for logic circuits that have specific functions, e.g., counters, memories, and arithmetic logic units. These control sequences may or may not be conditional.

Conventionally, the state machine enables the performance of a sequence of operations for producing control signals for controlling a slave circuit. The frequency of operations of the state machine is generally controlled by a clock signal $f_1$. In general, the state machine sends logic commands to the slave circuits by a control bus to which a sequencer and the slave circuits are connected. The logic commands include writing or reading information on a data bus. It is also possible that the sequencer may send a command to a particular slave circuit operating at a frequency $f_2$ for carrying out at least one operation in parallel.

In general, the state machine does not verify whether a particular slave circuit has received the command to be performed. Accordingly, the state machine limits itself, for example, to sending a command during a time interval in which the state machine is sure that the slave circuit will receive this command.

When the state machine and the slave circuit are synchronous, the state machine may send a command having a determined duration corresponding to a certain number of clock cycles. The synchronization between the state machine and the slave circuit makes it possible to ensure efficient reception. Synchronous refers to when the clock frequencies $f_1$ and $f_2$ are identical to or multiples of one another with respect to the clock signals originating from the same clock.

In contrast, when the clock frequency $f_1$ of the state machine and the clock frequency $f_2$ of the slave circuit are not synchronous, the reception of the control signal by the slave sequencer may become random. This could lead to malfunctioning of the integrated circuit. Not synchronous, i.e., asynchronous, refers to when the respective clock signals are different or undergo significant fluctuations during operation.

SUMMARY OF THE INVENTION

It is an object of the invention to prevent malfunctioning of an integrated circuit comprising at least one master circuit and one slave circuit operating at independent respective frequencies.

The integrated circuit comprises a master circuit having a clock input for receiving a first clock signal originating from a first clock circuit, and an output for providing a control signal. The control signal is activated during an active edge of the first clock signal. A slave circuit has a control input and a clock input for receiving a second clock signal originating from a second clock circuit. The second clock circuit is independent of the first clock circuit. The integrated circuit further comprises a first register having a clock input for receiving the second clock signal, a data input for storing the control signal during an active edge of the second clock signal, and an output is connected to the control input of the slave circuit. During an active edge of the second clock signal, the first register stores the control signal produced by the master circuit and provides the stored control signal. The signal delivered by the first register is synchronized with the second clock signal.

Preferably, the integrated circuit comprises a second register having a clock input for receiving the clock signal, a data input is connected to the output of the first register for storing the control signal during an active edge of the clock signal, and an output. The master circuit further comprises an information input connected to the output of the second register for receiving the control signal to deactivate the control signal at the output of the master circuit when the control signal received becomes active.

To interrupt sending of the control signal to the slave circuit, the input of the second register is connected to the output of the first register for storing the control signal received by the slave circuit during an active edge of the first clock signal. The second register delivers the stored control signal to the master circuit. The use of the two registers eliminates the difficulties caused by different and independent clock frequencies. Furthermore, the master circuit receives a return of the transmission of its control signal by the second register and the information input. This makes it possible to ascertain that the slave circuit has actually received the control signal.

According to another embodiment, the circuit further comprises a third register having a clock input for receiving the clock signal, a data input is connected to the output of the master circuit for storing the control signal during an active edge of the clock signal, and an output is connected to the input of the first register. The third register is connected between the first register and the master circuit. A fourth register has a clock input for receiving the clock signal, a data input is connected to the output of the first register for storing the stopping signal, and an output is connected to the input of the second register. The fourth register is connected between the first and second registers.

This arrangement primarily makes it possible to prevent a condition known as metastability, i.e., having only a slight margin of stability. This condition occurs during fast transitions of logic states on signals present at the input of the register. The signal at the input of the register must be stabilized and must be presented sufficiently in advance so that the register can store the signal during an active edge of the clock of the register. Otherwise, the stored signal is always erroneous which may lead to malfunctioning of the integrated circuit.

According to yet another embodiment, the circuit further comprises an inverter having one input and one output, wherein the input is connected to the output of the first register. The output of the first register is connected to the control input of the slave circuit. A logic gate has two inputs and one output, wherein a first input is connected to the input of the first register. A second input is connected to the output of the inverter. A fifth register has a clock input for receiving the clock signal. An input is connected to the output of the logic gate for storing the control signal, and an output is connected to the control input of the master circuit.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
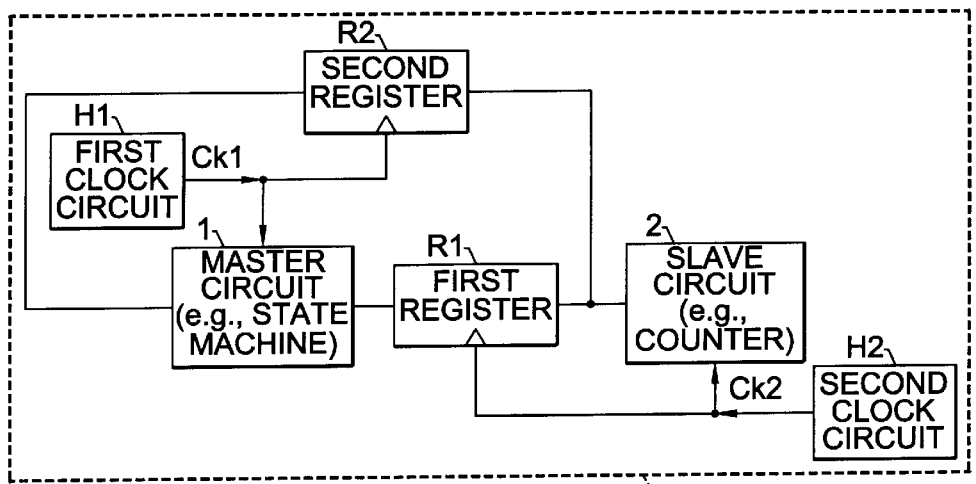
FIG. 1 shows an integrated circuit, according to the present invention.

With reference to FIG. 1, the integrated circuit C comprises a master circuit 1, a slave circuit 2, first and second clock circuits H1 and H2, and first and second registers R1 and R2. The master circuit 1 is, for example, a state machine and the slave circuit 2 is, for example, a counter. The first and second clock circuits H1 and H2 respectively provide first and second clock signals Ck1 and Ck2 at one output. The frequencies of the clock signals originate from two totally independent clock circuits.

The master circuit 1 has a clock input for receiving the clock signal Ck1, an information input and a control output for providing a control signal. The first register R1 has a data input connected to the control output of the master circuit 1, a clock input is connected to the output of the second clock circuit H2 for receiving the second clock signal Ck2, and one output. The slave circuit 2, i.e., the counter, has one control input connected to the output of the first register R1, and one clock input is connected to the output of the second clock circuit H2 for receiving the clock signal Ck2.

As shown in FIG. 1, the circuit C also has a second register R2 having a clock input connected to the output of the first clock circuit H1 for receiving the first clock signal Ck1. An input is connected to the output of the first register R1. An output is connected to the information input of the master circuit 1. The first and second registers R1 and R2, for example, are D type flip-flop circuits well known to those skilled in the art.

As indicated above, the master circuit 1 may send a control signal, for example, so that the slave circuit 2 performs an operation in parallel. The control signal is activated during an active edge of the first clock signal Ck1. In this example, the control signal could be a synchronous zero resetting command that has to be received only once. When the frequency of the clock signal Ck1 is greater than the frequency of the clock signal Ck2, the first register R1 stores and provides the control signal to the slave circuit 2 during a first active edge of the second clock signal Ck2.

Then, the second register R2 stores the control signal received by the slave circuit 2 and provides the control signal to the information input of the master circuit 1. This is done during a first active edge of the first clock signal Ck1, wherein the first active edge immediately follows the first active edge of the second clock signal Ck2. The first register R1 enables the control signal sent by the master circuit 1, which operates at a first frequency, to be synchronized with the clock signal Ck2 of the slave circuit 2.

During a second active edge of the first clock signal Ck1, the master circuit 1 interrupts the sending of the control signal after having received the control signal at the information input. Thus, during a second active edge of the second clock signal Ck2, the first register R1 no longer receives the control signal from the master circuit 1. The second active edge immediately follows the second active edge of the first clock signal Ck1. It can be observed that, in this first case, the control signal has been received by the slave circuit 2 only during one cycle of the second clock signal Ck2. The frequency of the first clock signal Ck1 is greater than the frequency of the second clock Ck2.

Figure 2:
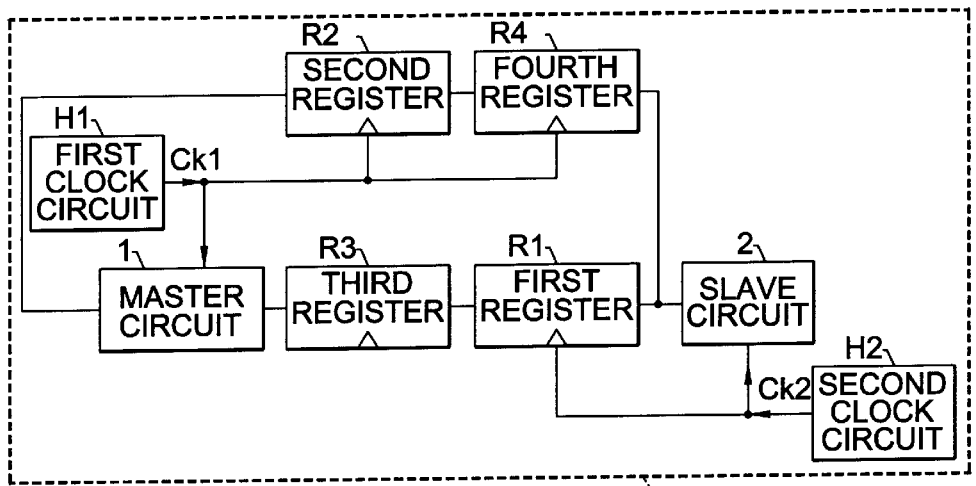
FIG. 2 shows a first embodiment using third and fourth registers, according to the present invention.

FIG. 2 shows the circuit C of FIG. 1 modified according to a first embodiment of the invention. The modified circuit C comprises a third register R3 having a clock input for receiving the clock signal Ck2. A data input is connected to the output of the master circuit 1 for storing the control signal during an active edge of the clock signal Ck2. An output is connected to the input of the first register R1. The third register R3 thus sets up the connection between the master circuit 1 and the first register R1.

Still referring to FIG. 2, a fourth register R4 has been added. The fourth register R4 has a clock input connected to the output of the first clock circuit H1 for receiving the clock signal Ck1, an input is connected to the output of the first register R1 for storing the stop signal, and an output is connected to the input of the second register R2. This sets up a connection between the first and second registers R1 and R2. The third and fourth registers R3 and R4 are, for example, D type flip-flop circuits well known to those skilled in the art.

The circuit C of FIG. 2 operates the same way as the circuit of FIG. 1. The addition of the third and fourth registers R3 and R4 eliminating possible stability problems at the inputs of the master circuit 1 and slave circuit 2. Stability problems are due to a change in states that occurs at active edges of the clock signal.

When a register R1 or R2 stores and provides an unstabilized signal during an active edge of the clock signal, the output of the register initially provides oscillations and then becomes stabilized on a logic state 0 or 1 in a random manner primarily determined by the internal construction of the register. This may influence operation of the circuit that follows the register. The third and fourth registers R3 and R4 thus limit the influence of the registers R1 or R2 on the master circuit 1 and the slave circuit 2.

The second and fourth registers R2 and R4 produce delays during the transmission of the control signal. Arrangements must therefore be made for the slave circuit 2 to receive the control signal during two clock cycles of the second clock signal Ck2. This is done with a delay by one clock cycle of the second clock signal Ck2 with respect to the circuit of FIG. 1.

Figure 3:
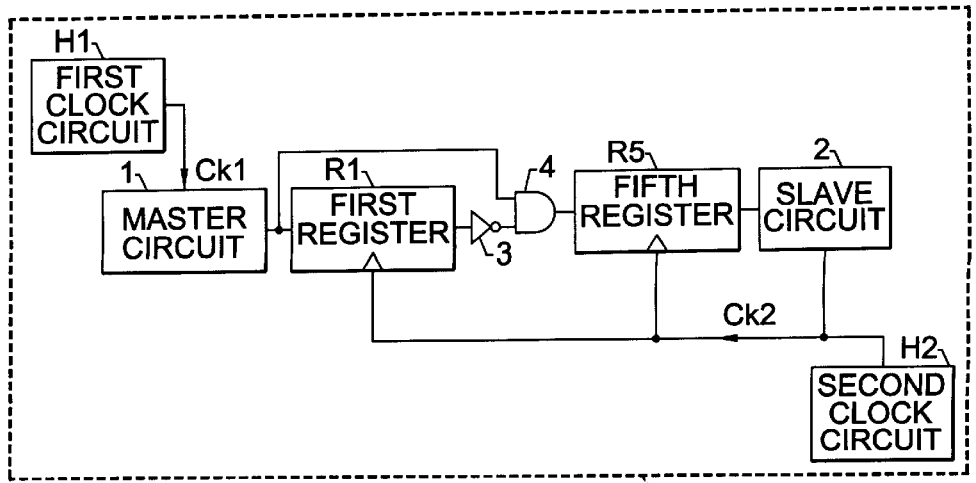
FIG. 3 shows a second embodiment using a logic gate and an inverter, according to the present invention.

In relation to FIG. 3, the circuit C1 comprises a master circuit 1, a slave circuit 2, first and second clock circuits H1 and H2, first and fifth registers R1 and R5, an inverter 3 and a logic gate 4. The master circuit 1 is, for example, a state machine and the slave circuit 2 is, for example, a counter. The first and second clock circuits H1 and H2 respectively provide first and second clock signals Ck1 and Ck2 at an output. The frequencies of the clock signals are derived from two independent clock circuits.

The master circuit 1 has a clock input connected to the output of the first clock circuit H1 for receiving the clock signal Ck1, and a control output for sending a control signal. The first register R1 has a data input connected to the control output of the master circuit 1. A clock input is connected to the output of the second clock circuit H2 for receiving the second clock signal Ck2. The inverter 3 has an input connected to the output of the first register R1, and an output. The logic gate 4 has two inputs and one input. A first input is connected to the input of the first register R1, and a second input is connected to the output of the inverter 3.

The fifth register R5 has an input connected to the output of the logic gate 4, a clock input is connected to the output of the second clock output H2 for receiving the second clock signal Ck2, and an output. The slave circuit 2 comprises a data input connected to the output of the fifth register R5, and a clock input is connected to the output of the second clock circuit H2 for receiving the second clock signal Ck2. The logic gate 4 is an AND type gate and the first and fifth registers are, for example, D type flip-flop circuits.

When the control signal sent by the master circuit is activated on an active edge of the clock signal Ck1, the first input of the logic gate 4 passes into a logic state 1. Furthermore, since the output of the first register R1 is in a logic state 0, the output of the inverter is in the logic state 1. Therefore, the output of the logic gate 4 is in a logic state 1.

During a first active edge of the second clock signal Ck2, the register R1 stores and provides the control signal to the input of the inverter 3. The register R5 stores and provides the logic signal 1 corresponding to the logic state of the output of the logic gate 4 to the control input of the slave circuit. During a second active edge of the second clock signal Ck2, the output of R1 is in a logic state 1. Therefore, the output of the inverter is in a logic state 0. The fifth register R5 stores and provides a logic state 0. Thus, the command is transmitted only during a clock cycle of the second clock signal Ck2.

The arrangement of FIG. 3 is particularly beneficial when the frequency of the clock signal Ck1 is less than the frequency of the clock signal Ck2. Alternative embodiments are also possible. For example, the AND type logic gate 4 may be replaced by an OR type logic gate if the control signal is active in the low state. It must be noted that the previous embodiments also operate when the frequencies of the clock signals Ck1 and Ck2 are derived from the same clock circuit. Furthermore, although the value is lower, the frequencies of the clock signals may be identical or may be multiples of one another.

That which is claimed is:

1. An integrated circuit comprising:
   a first clock circuit for providing a first clock signal;
   a second clock circuit for providing a second clock signal, said second clock circuit being independent of said first clock circuit;
   a master circuit having a clock input for receiving the first clock signal, and an output for providing a control signal activated during an active edge of the first clock signal;
   a slave circuit having a control input, and a clock input for receiving the second clock signal;
   a first register having a clock input for receiving the second clock signal, a data input for storing the control signal during an active edge of the second clock signal, and an output connected to the control input of said slave circuit; and
   a second register having a clock input for receiving the first clock signal, a data input connected to the output of said first register for storing the control signal during an active edge of the first clock signal, and an output.

2. An integrated circuit according to claim 1, wherein said master circuit further comprises an information input connected to the output of said second register for receiving the control signal for deactivating the control signal at the output of said master circuit when the received control signal is active.

3. An integrated circuit according to claim 2, further comprising:
   a third register having a clock input for receiving the second clock signal, a data input connected to the output of said master circuit for storing the control signal during an active edge of the second clock signal, and an output connected to the input of said first register, said third register connected between said first register and said master circuit; and
   a fourth register having a clock input for receiving the first clock signal, a data input connected to the output of said first register for storing the control signal, and an output connected to the input of said second register, said fourth register connected between said first and second registers.

4. An integrated circuit according to claim 1, wherein said slave circuit comprises a counter.

5. An integrated circuit according to claim 1, wherein said master circuit comprises a state machine.

6. An integrated circuit comprising:
   a master circuit having a clock input for receiving a first clock signal, and an output for providing a control signal activated during an active edge of the first clock signal;
   a slave circuit having a control input, and a clock input for receiving a second clock signal that is independent of said first clock signal;
   a first register having a clock input for receiving the second clock signal, a data input for storing the control signal during an active edge of the second clock signal, and an output connected to the control input of said slave circuit;
   a second register having a clock input for receiving the first clock signal, a data input connected to the output of said first register for storing the control signal during an active edge of the first clock signal, and an output; and
   said master circuit further comprises an information input connected to the output of said second register for receiving the control signal for deactivating the control signal at the output of said master circuit when the received control signal is active.

7. An integrated circuit according to claim 6, further comprising:
   a third register having a clock input for receiving the second clock signal, a data input connected to the output of said master circuit for storing the control signal during an active edge of the second clock signal, and an output connected to the input of said first register, said third register connected between said first register and said master circuit; and
   a fourth register having a clock input for receiving the first clock signal, a data input connected to the output of said first register for storing the control signal, and an output connected to the input of said second register, said fourth register connected between said first and second registers.

8. An integrated circuit according to claim 6, wherein said slave circuit comprises a counter.

9. An integrated circuit according to claim 6, wherein said master circuit comprises a state machine.

10. A method for controlling a slave circuit operating at a second frequency by a master circuit operating at a first and independent frequency, the method comprising the steps of:

receiving a first clock signal corresponding to the first frequency at a clock input of the master circuit;

providing a control signal activated during an active edge of the first clock signal at an output of the master circuit;

receiving a second clock signal corresponding to the second frequency at a clock input of the slave circuit;

receiving the second clock signal at a clock input of a first register;

receiving the control signal at a data input of the first register, and storing the control signal during an active edge of the second clock signal; and providing the control signal to a control input of the slave circuit;

receiving the first clock signal at a clock input of a second register;

receiving the control signal from the first register at a data input of the second register; and storing the control signal during an active edge of the first clock signal in the second register.

11. A method according to claim 10, further comprising receiving at an information input of the master circuit the control signal for deactivating the control signal at the output of the master circuit when the received control signal is active.

12. A method according to claim 11, further comprising:

receiving the second clock signal at a clock input of a third register;

storing the control signal provided at the output of the master circuit during an active edge of the second clock signal in the third register;

receiving the first clock signal at a clock input of a fourth register, receiving the control signal at a data input of the fourth register; and storing the control signal in the fourth register.

13. A method according to claim 12, wherein the first, second, third and fourth registers each comprises a D type flip-flop circuit.

14. A method according to claim 10, wherein the slave circuit comprises a counter.

15. A method according to claim 10, wherein the master circuit comprises a state machine.

16. An integrated circuit comprising:

a first clock circuit for providing a first clock signal;

a second clock circuit for providing a second clock signal, said second clock circuit being independent of said first clock circuit;

a master circuit having a clock input for receiving the first clock signal, and an output for providing a control signal activated during an active edge of the first clock signal;

a slave circuit having a control input, and a clock input for receiving the second clock signal;

a first register having a clock input for receiving the second clock signal, a data input for storing the control signal during an active edge of the second clock signal, and an output connected to the control input of said slave circuit;

an inverter having an input connected to the output of said first register;

a logic gate having a first input connected to the input of said first register, and a second input connected to an output of said inverter; and a second register having a clock input for receiving the second clock signal, an input connected to the output of said logic gate for storing the control signal, and an output connected to the control input of said slave circuit.

17. An integrated circuit according to claim 11, wherein said first and second registers each comprises a D type flip-flop circuit.

18. An integrated circuit according to claim 11, wherein said slave circuit comprises a counter.

19. An integrated circuit according to claim 11, wherein said master circuit comprises a state machine.

20. A method for controlling a slave circuit operating at a second frequency by a master circuit operating at a first and independent frequency, the method comprising the steps of:

receiving a first clock signal corresponding to the first frequency at a clock input of the master circuit;

providing a control signal activated during an active edge of the first clock signal at an output of the master circuit;

receiving a second clock signal corresponding to the second frequency at a clock input of the slave circuit;

receiving the second clock signal at a clock input of a first register;

receiving the control signal at a data input of the first register, and storing the control signal during an active edge of the second clock signal;

inverting an output signal from the first register; and performing a logic function based upon the inverted output signal and the control signal received at the input of the first register for providing the control signal to the control input of the second register;

receiving the second clock signal at a clock input of a second register;

receiving the control signal at an input of the second register;

storing the control signal in the second register; and providing the control signal to the control input of the slave circuit.

21. A method according to claim 20, wherein the first and second registers each comprises a D type flip-flop circuit.

22. A method according to claim 20, wherein the slave circuit comprises a counter.

23. A method according to claim 20, wherein the master circuit comprises a state machine.

* * * * *

UNITED STATES PATENT AND TRADEMARK OFFICE
CERTIFICATE OF CORRECTION

PATENT NO. : 6,175,257 B1  Page 1 of 1
DATED : January 16, 2001
INVENTOR(S) : M. Bernard Ramanadin It is certified that error appears in the above-identified patent and that said Letters Patent is hereby corrected as shown below:

<u>Drawings</u>,
Figure 2, delete "Figure 2" insert -- Figure 2 --

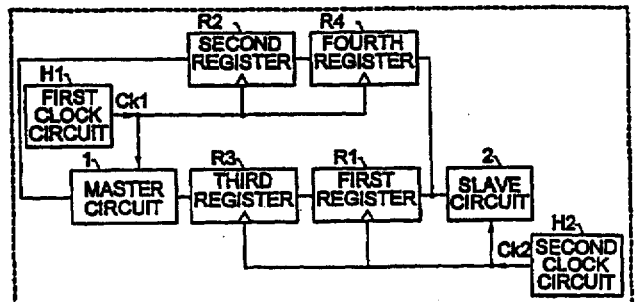

FIG. 2.

Signed and Sealed this

Eighteenth Day of December, 2001

Attest:

JAMES E. ROGAN
*Attesting Officer*  *Director of the United States Patent and Trademark Office*